United States Patent [19]

Perera et al.

[11] Patent Number: 5,202,140
[45] Date of Patent: Apr. 13, 1993

[54] STABILIZING COLOR IN KIWI FRUIT AND PRODUCT

[75] Inventors: Conrad O. Perera; Jennifer A. Venning, both of Auckland, New Zealand

[73] Assignee: Her Majesty The Queen in Right of New Zealand of Department of Scientific and Industrial Research, Division of Hortculture and Processing, Auckland, New Zealand

[21] Appl. No.: 908,552

[22] Filed: Jun. 30, 1992

Related U.S. Application Data

[63] Continuation of Ser. No. 326,339, Mar. 21, 1989, abandoned.

[30] Foreign Application Priority Data

Mar. 22, 1988 [NZ] New Zealand ............ 223971

[51] Int. Cl.$^5$ .................................... A23L 3/42
[52] U.S. Cl. .......................... 426/268; 426/639
[58] Field of Search ........................ 426/639, 268

[56] References Cited

U.S. PATENT DOCUMENTS

| | | | |
|---|---|---|---|
| 3,365,309 | 1/1968 | Pader et al. | 426/639 |
| 3,843,810 | 10/1974 | Fehnerling | 426/639 X |
| 4,350,711 | 9/1982 | Kahn et al. | 426/639 X |
| 4,547,376 | 10/1985 | Silver et al. | 426/639 X |
| 4,551,348 | 11/1985 | O'Mahony et al. | 426/639 |
| 4,626,434 | 12/1986 | O'Mahony et al. | 426/639 X |
| 4,767,630 | 8/1988 | Silver et al. | 426/639 X |

OTHER PUBLICATIONS

Winter, A Consumer's Dictionary of Food Additives, 1972, Crown Publishers, Inc.: New York, p. 203.
Dialog Data Base, File 51 (FSTA), Dialog Acc. No. 00234873, Abstracting Food Technology in New Zealand 1981, 16(7) 35, 37–38, 41, 43.
Dialog Data Base File 51 (FSTA), Dialog Acc. No. 00138175, Abstracting California Agriculture 1976, 30(10) 5–7.
Dialog Data Base, File 351 (WPI), Dialog Acc. No. 4177318, Abstracting JP61115442 (Jun. 3, 1986).

*Primary Examiner*—Joseph Golian
*Attorney, Agent, or Firm*—Jacobson, Price, Holman & Stern

[57] ABSTRACT

A method for producing a dried fruit product in which certain physical, chemical and/or sensory features such as green color, flavor and Vitamin C content are stabilized wherein pieces of fruit are produced by peeling and slicing from a green chlorophyll-containing fruit, the pieces of fruit are infused with a low molecular weight carbohydrate, preferably in an infusion solution comprising one or more of glucose, sucrose and fructose together with a buffering agent, and then the pieces are dried. The infused dried product is suitably packaged in an oxygen, water vapor and ultraviolet light impermeable medium for prolonged storage. A dried fruit product produced by the method is also claimed.

19 Claims, No Drawings

STABILIZING COLOR IN KIWI FRUIT AND PRODUCT

This is a continuation of application Ser. No. 07/325,339, filed Mar. 21, 1989, which was abandoned upon the filing hereof.

This invention relates to a method of producing a dried fruit product in which certain physical, chemical and/or sensory features such as taste and color are substantially stabilized, and/or a dried fruit product formed by such a method. The invention is intended particularly, though not necessarily solely, for use in relation to green chlorophyll-containing fruit, especially kiwifruit.

BRIEF SUMMARY OF THE INVENTION

It is an object of the invention to provide a method of stabilizing color in green-fleshed chlorophyll-containing fruit such as kiwifruit during drying of said fruit which will at least provide the public with a useful choice.

Accordingly in one aspect the invention consists in a method of stabilizing color in green fleshed chlorophyll-containing fruit during drying of the fruit by preventing degradation of chlorophyll in the fruit comprising:

infusing pieces of said fruit with a low molecular weight carbohydrate;

and drying the infused fruit pieces moisture content in the fruit pieces of between about 2% and about 4% by weight to a predetermined extent.

In a further aspect the invention consists in a method of producing a dried fruit product according to any of the examples herein.

In a still further aspect the invention consists in a dried fruit product when prepared by a method according to any of the preceding paragraphs.

In a still further aspect the invention consists in a dried fruit product when prepared by a method according to any of the examples herein.

When used herein "low molecular weight carbohydrate" includes monosaccharides, disaccharides, oligosaccharides, and mixtures thereof.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

DETAILED DESCRIPTION

One preferred form of the invention will now be described.

In the preferred form the invention provides a method of producing a dried fruit product in which certain physical, chemical and/or sensory features such as taste and color are stabilized.

Pieces of the fruit to be processed are cut to a suitable size, which may be adjusted according to the rate of infusion desired in a particular case, as obviously infusion will take place more rapidly into pieces of small volume and large surface area than the reverse. It is preferable that all of the pieces to be infused at one time be of a similar thickness, for example 5–6 mm slices or 10–11 mm slices.

The cut pieces are then infused with a carbohydrate to a predetermined extent. In the preferred form, this is carried out by vacuum infusion of the fruit pieces in an aqueous solution of a carbohydrate, preferably comprising between about 10% and about 70% carbohydrate by weight. We have obtained good results using a 50% carbohydrate solution by weight. The choice of carbohydrate is quite broad, and we have obtained good results with a mixture of glucose and fructose and especially with invert sugar. However, it is envisaged that many other forms of carbohydrate such as sucrose, and mixtures of sucrose with fructose, glucose, or both, could be used within the scope of the invention.

The length of time for infusion to take place will obviously be adjusted by one skilled in the art according to the volume: surface ratio of the pieces of fruit, the exact concentration of the carbohydrate infusion solution, and the extent of infusion desired for a particular fruit. It is necessary to ensure that the degree of infusion is sufficient to give the required stabilizing effect, but without making the fruit too sweet to the taste. Using a 50% sugar solution, with 5 to 6 mm thick slices of fruit, we have found that an infusion period of 15 to 20 minutes produces a good result.

By way of example, ripe kiwifruit generally has a pH of about 3.2 to 3.3 and a titratable acidity of about 1.2%. This can give rise to an acidic flavor in the final finished product. We have found that the acidic flavor can be reduced considerably by incorporating a buffering salt in the carbohydrate solution which buffers the acidity in the fruit at about pH 4.5. This can reduce the harshness of the perceived acidity and improve the flavor of the finished product. We have found that the presence of the buffering salt also increases the stability of the chlorophyll pigments. A suitable buffering salt for this purpose is a salt of citric acid, most preferably sodium or potassium citrate used in low concentrations.

After the fruit pieces have been infused with the carbohydrate to a predetermined extent appropriate to the fruit, the infused fruit pieces are dried to a predetermined extent.

It has been found that a good shelf life is obtained with the product by drying the fruit pieces to a moisture content of between about 2% and about 4% by weight.

The infused fruit pieces are preferably vacuum dried, preferably at about 40°–50° C. until the moisture content is between about 2% and 4% by weight.

The drying step may alternatively be carried out in two steps, the first being an air drying step which is carried out at an elevated temperature, preferably between about 40° and about 50° C., until the pieces of fruit have a minimum moisture content of about 40% and most preferably have a moisture content of about 45%. At the temperature given, this has been found to take about 4 hours. The air dried fruit pieces are then further dried under vacuum, preferably at about 40°–50° C. until the final moisture content is between about 2% and 4%. The residual moisture content is removed by storing the vacuum dried material over a suitable dessicant in a sealed container for a period of 1–2 weeks. This residual drying process can be enhanced by passing air through the dessicator in a closed loop. The moisture content of the fruit pieces is reduced by this method to about zero.

For extended shelf life the dried product is then packaged in an oxygen, water vapor and UV light impermeable medium. In order to protect the product from oxygen degradation, the packaging may be vacuum packed, or nitrogen flushed, or packed with an oxygen scavenger, such as will be known to those skilled in the art.

It has been found that this method in accordance with the invention is particularly suitable for producing a dried kiwifruit product having stabilized color, flavor and Vitamin C content over an extended shelf life, but it is envisaged that it could also be applied to other fruit particularly other chlorophyll-containing green fruit, such as kiwano.

An example of a method in accordance with the invention for producing a stabilized dried fruit product will now be given, but it is not intended that the precise parameters given within the example should be in any way limiting.

EXAMPLE

A quantity of kiwifruit is peeled, and sliced to give slices of about 5 to 6 mm in thickness. An infusion solution is also prepared comprising an aqueous solution of invert sugar containing 50% sugar by weight and 1% sodium or potassium citrate.

500 grams of the peeled sliced kiwifruit is then placed in a container and 500 grams of the prepared infusion solution is added and it is ensured that all fruit pieces are completely immersed in this solution. The fruit in the infusion solution is then vacuum infused for 15 to 20 minutes.

The air dried fruit pieces are then transferred to a vacuum drier and vacuum dried at about 40°-50° C. until a final moisture content of 2% to 4% by weight is reached. Alternatively, the infused pieces are first transferred onto mesh trays and air dried at 40° to 50° C. until a moisture content of about 45% by weight is reached (approximately 4 hours at 40° to 50° C.), and then vacuum dried at 40°-50° C. to a 2%-4% moisture content by weight. The residual moisture content of the vacuum dried kiwifruit slices was removed by storing over silica gel in a dessicator for a period of 1-2 weeks to give a final moisture content of about zero.

The infused dried fruit pieces are then packed under vacuum or nitrogen flush or with an oxygen scavenger in an oxygen, water vapor, and ultra-violet light impermeable packaging medium such as will be known to those skilled in the art. It would also be possible to pack the fruit pieces in transparent packs having shelf appeal, but for long term storage these would preferably themselves be retained in an ultra-violet light impermeable package.

The green color of many green fruit, such as kiwifruit, is due to the presence of a group of natural pigments known as chlorophylls. They are magnesium chelated tetrapyrroles each having a propionate esterified with phytol alcohol at position 7 in the ring structure. In green plant material, chlorophylls are known to occur within the plastid bodies known as chloroplasts. Chlorophylls are insoluble in water but soluble in organic solvents such as alcohol, ether, benzene and acetone.

Chlorophyll pigments are generally susceptible to degradation due to the action of certain enzymes as well as to heat, light and acid. It is known that during the drying of green fruit and vegetables the chlorophyll pigments are converted to brown pheophytins by the replacement of the magnesium ion with hydrogen. This conversion is brought about by organic acids that are released when cells are ruptured as well as those that are formed during heating. It is also known that lipid degrading enzymes such as lipase, lipoxygenase and linoleate hydroperoxide isomerase have a bleaching effect on chlorophylls. Dehydrated products in clear packaging may undergo photo-oxidation and subsequent loss of green colors.

In dried kiwifruit in particular the chlorophyll pigments are degraded quite rapidly during the drying process and subsequent storage. The temperature of drying is very critical with chlorophyll conversion to brown pheophytin taking place above 50° C., depending on the time of drying and relative humidity of the air. Usually dried kiwifruit is olive green to brown in colour and turns to dark brown on storage within a few weeks. This change in color is usually accompanied by the development of unpleasant odors and flavors.

It is an advantage of the method of the present invention and of the product of the present invention that a dried fruit product may be provided which has enhanced stability of certain physical chemical and/or sensory features, in particular flavor, color and Vitamin C content and an extended shelf life. It is advantageous to produce a green dried fruit product from green-fleshed fruit which can be stored for extended periods, and which may be used in, for example, cereals containing mixed dried fruits, baking, and confectionery products. The product of the present invention in at least the preferred form has a shelf life of up to nine months or more under suitable packaging, retaining good flavor, color and Vitamin C characteristics over this time. In at least the preferred form the product of the invention has palatable sweetness and reduced tartness, and is also of a desirable texture following the drying sequence described herein. Thus it can be seen that the invention provides a method of producing a dried fruit product in which certain physical, chemical and/or sensory features are stabilized and/or a dried fruit product formed by such a process and/or a method of stabilizing color in fruit containing chlorophyll during drying, which is advantageous, uses biologically acceptable, naturally occuring treatment ingredients, and which can be readily applied to produce a useful, palatable product.

We claim:

1. A method of stabilizing color in acidic kiwifruit, during drying of said fruit by preventing degradation of chlorophyll in said fruit, comprising:
   infusing said fruit in an infusion solution comprising a low molecular weight carbohydrate;
   incorporating a citrate buffering salt in said infusion solution to buffer the acidity at substantially pH 4.5 for stabilizing chlorophyll pigments in said fruit; and
   drying the infused fruit at a temperature between about 40° C. and about 50° C. to produce a moisture content in said fruit of between about 2% and about 4% by weight.

2. A method as claimed in claim 1 and further comprising peeling and slicing said fruit prior to said infusion step to between about 5 mm and about 11 mm in thickness.

3. A method as claimed in claim 1 wherein said carbohydrate is in the form of an aqueous infusion solution comprising between about 10% and about 70% carbohydrate by weight.

4. A method as claimed in claim 1 wherein said carbohydrate is selected from the group consisting of glucose, fructose, sucrose and mixtures thereof.

5. A method as claimed in claim 1 wherein said carbohydrate comprises invert sugar.

6. A method as claimed in claim 1 wherein said drying comprises first air drying said fruit to a moisture content of about 40% by weight and then vacuum drying said fruit to said moisture content between about 2% and about 4% by weight.

7. A method as claimed in claim 6 and further comprising a further drying step whereby the residual moisture content of said fruit is substantially removed.

8. A method as claimed in claim 1 and and further comprising packaging the infused and dried fruit product in an oxygen, water vapor, and ultra-violet light impermeable medium.

9. A method as claimed in claim 5 wherein:
said infusion solution comprises an aqueous solution of invert sugar in an amount of approximately 50% by weight, and a buffering salt in an amount of approximately 1% by weight of a material selected from the group consisting of sodium citrate and potassium citrate.

10. A method as claimed in claim 9 and further comprising:
completely immersing said fruit in said infusion solution;
vacuum infusion said fruit in said infusion solution for a period in the range of 15 to 20 minutes; and wherein
said drying comprises air drying to reduce the moisture content in said fruit to about 45% by weight and thereafter vacuum drying to said moisture content of between about 2% and about 4% by weight.

11. A method as claimed in claim 10 wherein:
said drying further comprises after vacuum drying, storing said fruit over silica gel in a desiccator for a period of about one to two weeks to reduce the moisture content in said fruit to about zero.

12. A dried fruit product prepared by the method as claimed in claim 1.

13. A method of producing from acidic kiwifruit, a dried fruit product in which at least one of the green color, flavor and Vitamin C content is stabilized comprising the steps of:
peeling and slicing said fruit to produce slices having a thickness between about 5 mm and about 11 mm;
infusing said slices with an aqueous infusion solution of a low molecular weight carbohydrate to a predetermined extent, said carbohydrate being selected from the group consisting of glucose, fructose and sucrose, said infusion solution comprising between about 10% and about 70% of said carbohydrate by weight;
incorporating a citrate buffering salt in said infusion solution to buffer the acidity at substantially pH 4.5 for stabilizing chlorophyll pigments in said fruit;
drying said infused slices at between about 40° C. and about 50° C. to produce a moisture content of between about 2% and about 4% by weight; and
packaging the infused and dried product in an oxygen, water vapor and ultra-violet light impermeable medium.

14. The method as claimed in claim 13 wherein:
said drying comprises vacuum drying.

15. The method as claimed in claim 13 wherein:
said drying comprises air and vacuum drying.

16. A method as claimed in claim 13 wherein:
said infusion solution comprises an aqueous solution of invert sugar in an amount of approximately 50% by weight, and a buffering salt in an amount of approximately 1% by weight of a material selected from the group consisting of sodium citrate and potassium citrate.

17. A method as claimed in claim 16 and further comprising:
completely immersing said fruit in said infusion solution;
vacuum infusing said fruit in said infusion solution for a period in the range of 15 to 20 minutes; and wherein
said drying comprises air drying to reduce the moisture content in said fruit to about 45% by weight and thereafter vacuum drying to said moisture content of between about 2% and about 4% by weight.

18. A method as claimed in claim 17 wherein:
said drying further comprises after vacuum drying, storing said fruit over silica gel in a desiccator for a period of about one to two weeks to reduce the moisture content in said fruit to about zero.

19. A dried fruit product prepared by the method as claimed in claim 13.

* * * * *